United States Patent Office 3,087,543
Patented Apr. 30, 1963

3,087,543
METHOD FOR IMPROVING OIL-WATER RATIOS OF OIL AND GAS WELLS
Harry S. Arendt, Bellaire, Tex., assignor, by mesne assignments, to Jersey Production Research Company, Tulsa, Okla., a corporation of Delaware
No Drawing. Filed Jan. 27, 1960, Ser. No. 4,855
1 Claim. (Cl. 166—30)

This invention relates to a process for preferentially reducing or eliminating water production from an oil or gas producing subsurface formation.

In producing oil from both natural and artificial water drive oil reservoirs, the wells ultimately produce sufficiently large volumes of salt water to constitute a serious operating problem and eventually production of the salt water forces abandonment of the well. The cost of raising the brine to the earth's surface and of separating it from the oil represents an economic loss and, in addition, in many instances, there is a problem in disposal of the waste water. Even more importantly, the total volume of fluid that can be produced daily is often limited by the well bore and artificial lift equipment so that unnecessary water production unnecessarily reduces the oil production rate. In many instances, a portion of the reservoir is producing essentially all salt water while the remainder of the section is producing a substantial quantity of oil. If production from the watered-out portion of the reservoir is eliminated or reduced, the production, handling and disposal of large volumes of water is avoided. This results in major savings in operating costs, the avoidance of unnecessary depletion of the water drive, and increased production from the remaining oil interval which results in greater ultimate recovery and greater current income.

Attempts have been made to reduce production of water by plugging off the lower water section of the production interval with cement, plastic, or other similar materials or by cementing off the entire production interval and selectively reperforating in the oil producing portion. However, these procedures have disadvantages. In the first place, they are expensive and secondly, it is often difficult or impossible to predict which part of the producing interval is producing water and which is still producing oil. Many times the wrong interval is retained and in some instances the entire producing interval is essentially at the same degree of depletion. Recently, an oil slurry cement has been employed in the supposition that by avoiding water in the slurry, the cement would depend upon formation water to set up and would consequently cement off the water producing zone. Little success has been obtained, however, with this latter procedure because of its inherent weaknesses and operational problems.

The present invention provides a solution to the problem of water production by preferentially shutting off the watered-out portion of the producing interval. This method essentially comprises treating the entire producing interval with an acrylamide carboxylic acid copolymer. The large molecules of the copolymer plug the rock pores of the formation material by adsorbing to the pore walls thereof and reduce the permeability of the producing formation to only a small fraction of its original permeability. However, when oil produces, the formation is restored to essentially its original permeability whereas water has much less effect in restoring permeability. Thus, permeability of the substantially watered-out portion of the formation is reduced substantially (approximately ½ of original capacity) while the portion of the formation that is capable of producing a substantial percentage of oil will be restored essentially to its original capacity within a short time by the flow of oil through it. Advantages of this procedure over known attempts to shut off production of water reside in:

(1) The cost of this method is only a fraction of the cost of other methods;

(2) No knowledge is necessary of which of the zones is watered-out since the action of the copolymer is inherently selective and automatic. Thus, there is no danger of erroneously shutting off a zone which is still oil productive;

(3) Very thin zones may be shut off or retained;

(4) There is no danger of damaging the oil production section as is the case during the use of cementing procedures;

(5) The low cost of the method permits its use in wells where there is a relatively low chance of success;

(6) The low cost of the method also permits re-treatment of an interval as continued depletion again results in high water production;

(7) The work can usually be performed without disturbance of the subsurface equipment thereby avoiding possible risk of damaging the well;

(8) The low cost and lack of possible damage to the formation permits use at a relatively early stage of depletion and relatively low water percentage; and (9) The availability of a cheap and automatically selective method of shutting off water makes it practicable to utilize longer initial completion intervals and where desirable include several sand members of differing producing characteristics.

Thus, a primary object of this invention is to provide an improved method for selectively preventing water production from an oil producing formation.

To illustrate the feasibility of the operation of the invention, a series of laboratory tests were conducted at a temperature of 180° F. and at a differential pressure of 100 lbs. per sq. in. on Berea sandstone cores using as the copolymer "Separan 2610" in concentrations of about 0.175 lb./bbl. water. Separan 2610 is a commercial product marketed by The Dow Chemical Company. The data resulting from these experiments are shown in the following table:

| Test No. | Description of core preparation | Effective permeabilities of core before injection of copolymer, md. | | Recovery of core permeability after injection of copolymer, percent of original effective permeability to that fluid | |
|---|---|---|---|---|---|
| | | $K_o$ | $K_w$ | $K_w$ | $K_o$ |
| 1 | Restored state | 59.8 | | | 31.8 |
| 2 | do | 29.6 | | | 73.0 |
| 3 | Oil saturated | 61.0 | | | 86.2 |
| 4 | do | 66.0 | | | 76.7 |
| 5 | Restored state residual oil | 48.5 | | | 49.9 |
| 6 | Restored state | 38.2 | | | 75.0 |
| 7 | Restored state residual oil heated to 600° C. | 72.9 | 10.1 | 45.5 | 96.4 |
| 8 | do | 70.6 | 7.8 | 43.6 | 90.0 |

$K_o$=permeability to kerosene.
$K_w$=permeability to water.

For tests Nos. 1 and 2 an air filled core was saturated with a 5% brine solution and flowed to connate water with kerosene. The original core permeability to kerosene was measured at connate water. The core was flushed with an aqueous solution of acrylamide carboxylic acid copolymer. Kerosene was flowed through the core until the permeability to kerosene was constant and recovery was determined as the percent of original permeability to kerosene at connate water.

For tests Nos. 3 and 4 an air filled core was saturated with kerosene and the original core permeability to kerosene was measured. The core was flushed with an aqueous solution of the same copolymer. Kerosene was flowed through the core until permeability to kerosene was constant and recovery was determined as the percent of original permeability to kerosene.

For tests Nos. 5 and 6 an air filled core was saturated with a 5% brine solution and flowed to connate water with kerosene. The original core permeability to kerosene was measured at connate water. The core was flushed with 5% brine solution to residual oil saturation. Then, the core was flushed with an aqueous solution of the same copolymer. Thereafter, kerosene was flowed through the core until permeability to kerosene was constant and the recovery was determined as the percent of original permeability to kerosene at connate water.

As seen from the experiments, tests Nos. 1 to 6, the recovery of core permeability to oil varied from about 32 to 86%. This variation in the damage was apparently caused by the varying clay content in the Berea cores. The copolymer has a strong affinity for and is readily adsorbed on clay polymers. The polymer causes the clay particles to group and then effectively bond the particles. This adsorption is essentially an irreversible process. The susceptibility of the formation rock for a given reservoir to clay swelling can be predicted from core analysis.

For tests Nos. 7 and 8 an air filled core was heated to 600° C. to render the clays present in the core insensitive to fluids. The core was saturated with a 5% brine solution and flowed to connate water with kerosene. The original permeability to kerosene was measured. The 5% brine solution was flowed through the core until permeability to brine was constant. The original permeability to brine at original oil saturation was measured and the core then was flushed with an aqueous solution of the copolymer. Then a 5% brine solution was flowed through the core until permeability to brine was constant and the recovery was determined as a percent of the original permeability to brine at original oil saturation thereafter kerosene was flowed through the core until permeability was constant and the recovery was determined as the percent of original permeability to kerosene at connate water.

Thus, in the experiments for the restored state, with cores which were heat-treated to destroy the effect of the clays, the permeability to water at residual oil saturation was reduced approximately 55% by the injection of the copolymer whereas the permeability to oil was reduced approximately 5%.

These experiments show that the copolymer provides a desirable water shut-off material.

Having fully described the method and objects of my invention, I claim:

A method for preferentially inhibiting water production from a subsurface oil productive formation, the producing interval of which includes a watered-out portion and a portion capable of producing a substantial percentage of oil comprising the steps of treating the producing interval by injecting into it an aqueous solution of an acrylamide carboxylic acid copolymer to reduce the permeability of the producing interval to only a small fraction of its original permeability; and then producing fluids from said producing interval, the portion of the producing interval capable of producing a substantial percentage of oil being restored to near its original permeability, but the watered-out portion of the producing interval being only partially restored to substantially less than its original permeability, which results in substantially reduced water production from said producing interval.

References Cited in the file of this patent
UNITED STATES PATENTS

| | | |
|---|---|---|
| 2,229,177 | Kennedy et al. | Jan. 21, 1941 |
| 2,670,048 | Menaul | Feb. 23, 1954 |
| 2,731,414 | Binder et al. | Jan. 17, 1956 |
| 2,747,671 | Nowak et al. | May 29, 1956 |
| 2,779,416 | Clark | Jan. 29, 1957 |
| 2,805,720 | Wiegand | Sept. 10, 1957 |
| 2,827,964 | Sandiford et al. | Mar. 25, 1958 |